Oct. 9, 1956

A. H. MYLES ET AL 2,766,416

CONTROL SYSTEM FOR INDUCTION MOTOR AND BRAKING
GENERATOR COMBINATION

Filed May 22, 1953

INVENTORS.
ASA H. MYLES &
HAROLD J. RATHBUN
BY John H. Leonard &
Harold J. Rathbun,
their ATTORNEYS.

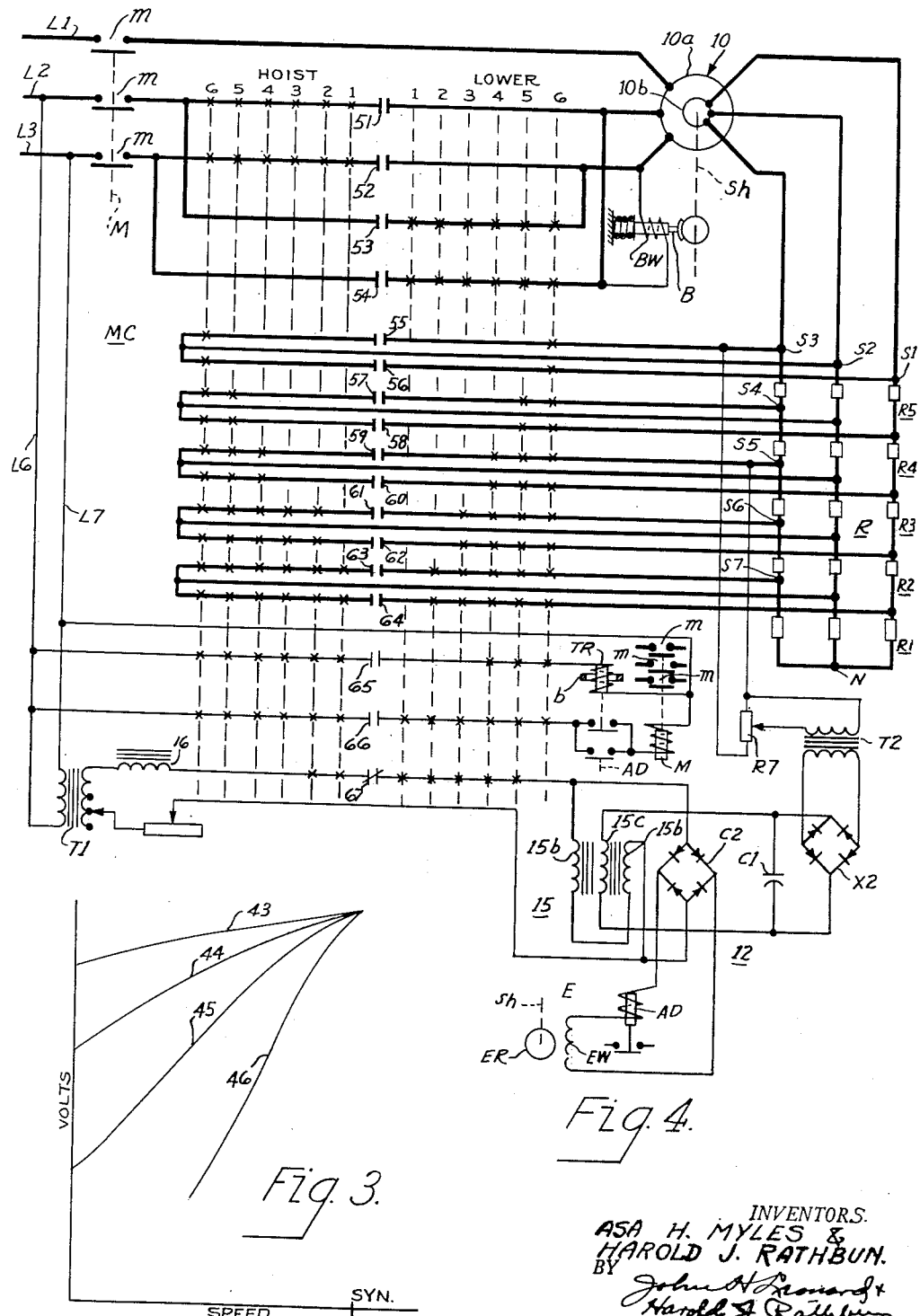

United States Patent Office 2,766,416
Patented Oct. 9, 1956

2,766,416

CONTROL SYSTEM FOR INDUCTION MOTOR AND BRAKING GENERATOR COMBINATION

Asa H. Myles, Solon, and Harold J. Rathbun, Cleveland, Ohio, assignors, by mesne assignments, to Square D Company, Detroit, Mich., a corporation of Michigan Application May 22, 1953, Serial No. 356,642

12 Claims. (Cl. 318—209)

This invention relates to systems of control for motor drives in which a polyphase wound rotor induction motor coupled to an artificial load, such as an eddy current brake or other type of braking generator, is utilized for apparatus in which the actual load at times overhauls and drives the motor and in which the speed of the overhauling load must be controlled. While not limited thereto, the invention is particularly advantageous for controlling crane hoists.

In the co-pending patent applications of C. A. Schurr, Serial No. 273,906, filed February 28, 1952, now Patent No. 2,687,505, issued August 24, 1954, and Serial No. 341,940, filed March 12, 1953, there are disclosed two satisfactory control systems of the foregoing type. In these prior control systems, the excitation of the braking generator varies directly with the motor speed in response to the electrical condition of the secondary circuit of the motor, but the determination of the range of the variation of the excitation for each selected speed point requires the use of several manually operated contact elements and a tapped resistor. In magnetic controllers, these additional contact elements can be provided only by a larger and more complicated master switch than would otherwise be necessary, and the necessity for the additional contact elements presents difficulties when it is attempted to embody the prior control systems into manually operated face-plate or drum controllers.

It is an object of this invention to provide, for a motor operatively coupled to a power consuming device, an improved control system in which the power consumption ability of the device is varied in relation to the speed of the motor.

Another object is to provide a system of control providing operating characteristics comparable to those provided by the systems described in the foregoing applications, but requiring fewer manually operated circuit control contacts thereby enabling the control to be effected either by a simplified master switch and associated electromagnetic contactors or by a relatively simple and conventional manual controller.

Another object is to provide a system of control in which the change in voltage distribution along a resistor in the secondary circuit of a wound rotor motor is used to alter the range of variation in the excitation of a braking generator coupled to the motor.

In one embodiment of the present invention, a magnetic amplifier, which may be a simple saturable core reactor having a single control winding, is operative to control the excitation of a braking generator coupled to the shaft of a wound rotor motor, and is so arranged that the excitation of the braking generator varies in an inverse relation with the excitation of the control winding. An alternating voltage taken from a portion of one leg of a resistor in the secondary circuit of the motor is rectified and the resulting direct voltage is impressed on the control winding of the amplifier. As portions of the leg of the resistor are excluded from the secondary circuit, the voltage distribution along the leg is changed and the magnitude of the voltage signal is changed thereby and in turn alters the range of variation of the generator excitation. The resistance of the non-excluded portion of the resistor is so related to the total resistance of the resistor for each selected speed point that the range of excitation of the generator for each of the speed points is properly correlated with the speed-torque characteristic of the motor for the corresponding speed point to give the desired speed regulation throughout the entire normal and abnormal loading range.

Other objects and advantages will become apparent from the following description wherein reference is made to the drawings, in which:

Figures 2 and 3 are graphs showing operating characteristics of the invention; and, Figure 4 is a wiring diagram showing the invention embodied in a manual controller.

Figure 1:
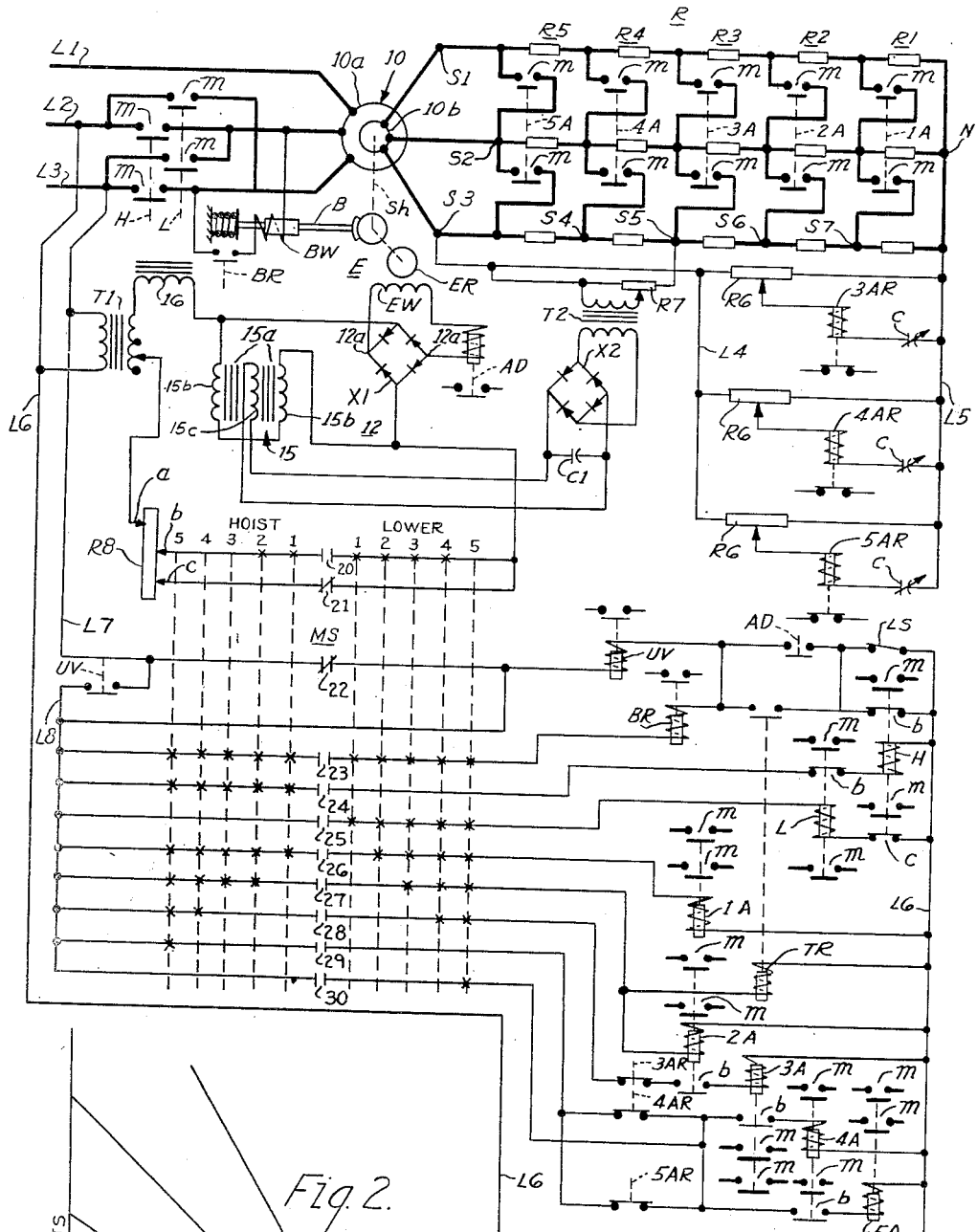
Figure 1 is a wiring diagram showing the invention embodied in a magnetic controller.

The control systems illustrated in Figure 1 and Figure 4 comprise a plurality of electromagnetic contactors and relays each of which is diagrammatically shown in the wiring diagrams. To simplify the drawings, many of the contactor and relay contacts are shown in convenient physical locations in the wiring diagrams as well as in conjunction with their respective operating windings.

Referring to Figure 1, a polyphase wound rotor induction motor 10 which may be used for operating a hoist mechanism (not shown) has a primary winding 10a arranged to be supplied with power, for hoisting and lowering operations selectively, from a suitable power source represented by supply lines L1, L2, and L3, and has a secondary winding 10b provided with secondary terminals S1, S2, and S3 to which is connected a Y-connected resistance bank or resistor R comprising sections R1, R2, R3, R4, and R5 and arranged in legs connected together at a neutral point N. The secondary winding 10b and the resistor R thus constitute a secondary circuit for the motor 10. Preferably the resistor R is balanced and remains balanced as the sections R1 through R5 are excluded.

The motor 10 is shown as coupled to a suitable spring-applied, electromagnetically-released, friction brake B having an operating winding BW preferably arranged to be connected across two of the primary terminals of the motor 10 upon closure of normally open contacts of an electromagnetic brake relay BR.

A control means for the motor may comprise a suitable power consuming device or artificial load such as a braking generator E of the eddy current brake type having a field winding EW and an eddy current member or rotatable armature ER which is coupled to shaft Sh of the motor 10 either directly, as indicated in Figure 1, or by means of a suitable gear train (not shown). Although in the illustrated embodiment of the invention the braking machine E is shown as an eddy current brake, it will be understood that other types of generators and electric power consuming devices having suitable speed-torque characteristics may be used to obtain many of the advantages of this invention. Preferably, the torque output of the braking machine E, when it is excited at constant voltage, increases rapidly at slow speeds and either reaches substantially a maximum value at a speed less than the synchronous speed of the motor 10 or increases less rapidly at higher speeds.

Power connections for causing the motor 10 to operate in the hoisting direction are completed upon closure of a pair of normally open main contacts m of an electromagnetic contactor H, and power connections for causing the motor 10 to operate in the lowering direction are completed upon closure of a pair of normally open main contacts m of an electromagnetic contactor L. Control of the amount of the resistor R effectively inserted in the secondary circuit of the motor 10 may be provided by a plurality of electromagnetic contactors 1A, 2A, 3A, 4A, and 5A each having a pair of normally open main contacts indicated at m for excluding or selectively short circuiting the resistor sections R1 through R5 and some having auxiliary or control circuit contacts to be described. The terminals between the sections R1 through R5 of the lowermost leg of the resistor R are identified as S4, S5, S6, and S7.

A plurality of suitable relays may be provided for controlling the rate of acceleration of the motor 10 and are shown as electromagnetic, speed-responsive relays 3AR, 4AR, and 5AR connected to the secondary circuit in resonant operating circuits of the type described and claimed in Leitch Patent No. 2,165,491. Since a complete description of such resonant, relay-operating circuits in a hoist controller may be had from McArthur and Myles Patent No. 2,325,413, only a brief description thereof is included herein.

Each of the resonant relay operating circuits comprises a suitable capacitor C, which may be adjustable as indicated, and a potentiometer resistor R6, the resistors R6 being connected in parallel with each other between a conductor L4 connected to the secondary terminal S3 and a conductor L5 which may be connected to the neutral point N. The operating windings of the relays 3AR, 4AR, and 5AR are connected in series with their respective capacitors C between the conductor L5 and an adjustable tap on their respective resistors R6. The relays 3AR, 4AR, and 5AR have respective sets of normally closed contacts which, as explained in the aforementioned Leitch patent, open concurrently upon application of power to the primary winding 10a and close in sequence at predetermined speeds as the motor 10 accelerates depending upon the capacity of the respective capacitors C and the adjustment of the taps on the respective resistors R6, closure of the relay contacts being caused by impairment of resonance of their respective relay circuits as the frequency of the secondary voltage of the motor 10 decreases during acceleration.

The winding EW of the eddy current brake E is energized while the motor 10 is deenergized and at certain times during operation of the motor 10 by the unidirectional voltage appearing across output terminals 12a of a suitable supply or brake exciting circuit means 12 including an amplifying means such as a magnetic amplifier. The magnetic amplifier may be in the form of a saturable core reactor 15 having a saturable core 15a, a pair of main or impedance windings 15b, and a single control winding 15c. By a single winding is meant either one winding only or a plurality of windings in series or parallel and having but two input terminals so as to be in operative effect a single winding. Although a specific and well known form of saturable core reactor is diagrammatically illustrated, it will be understood that other forms of saturable or variable impedance devices having suitable characteristics can be used if desired.

In addition to the saturable core reactor 15, the brake exciting circuit means 12 comprises suitable transformers T1 and T2, full wave rectifiers X1 and X2, adjustable resistors R7 and R8, and an impedance device such as a reactor 16 which may be adjustable if desired. As will become apparent, the circuit means 12, when concurrently energized by a substantially constant alternating reference voltage and by a variable alternating voltage derived from the secondary circuit of the motor 10, provides a unidirectional output voltage at its terminals 12a that varies inversely with the variable alternating voltage. Although a preferred embodiment of a brake exciting circuit means is shown in the drawing, the invention may be used with other brake exciting circuit means having suitable characteristics.

An electromagnetic relay AD which has its operating winding connected in series with the winding EW across the terminals 12a is provided to protect against excessive lowering speeds in a manner to be described should the winding EW inadvertently become deenergized.

When the supply lines L2 and L3 are energized, a substantially constant alternating potential is impressed across the primary winding of the transformer T1. A means to adjust the value of the voltage at the secondary of the transformer T1 is desirable and the secondary winding is provided with taps as indicated for this purpose. The rectifier X1 is supplied with alternating voltage from the secondary winding of the transformer T1 through a circuit forming part of the circuit means 12 and including the reactor 16 and the resistor R8 in series. The reactance windings 15b of the saturable core reactor 15 are connected in series with each other directly across the alternating current or input terminals of the rectifier X1, so that the resistor R8 and the reactor 16 are interposed in the circuit between the windings 15b and the transformer T1. Accordingly, a change in the reactance of the winding 15b causes a change in the voltage drop across the reactor 16 and the effective portion of the resistor R8 so that the resulting unidirectional potential appearing across the output terminals 12a of the rectifier X1 is dependent upon the degree of saturation of the core 15a of the reactor 15. The degree of saturation of the core 15a depends upon the amount of excitation of the saturating or control winding 15c wound on the core 15d. For any given adjustment of the transformer T1 and excitation of the winding 15c, the alternating voltage at the rectifier X1 is determined by adjustment of taps a, b, and c of the resistor R8 and by selective operation of normally open contacts 20 and normally closed contacts 21 of a suitable control device such as a five-position, reversing master switch MS also having contacts 22 through 30. As will become apparent hereinafter, only the portion of the resistor R8 between its taps a and b is effective during operation of the motor 10. Preferably, this portion of the resistor R8 has a very small ohmic value relative to the impedance of the reactor 16.

The control winding 15c is arranged to be supplied with direct current from the rectifier X2 which has its alternating current input terminals connected across the secondary winding of the transformer T2 the primary winding of which is supplied from the secondary circuit of the motor 10, and as shown, is adjustably connected across a portion of a resistor R7 which in turn is connected between the secondary terminals S3 and S5. The current in the control winding 15c is thus dependent upon the voltage induced in the secondary winding 10b and the distribution of that voltage along the lowermost leg of the resistor R. The value of the voltage at the terminals S1, S2, and S3 varies inversely with the speed of the motor at speeds below synchronism and depends to some extent on the amount of current flowing in the circuit, whereas the voltage distribution along the lowermost leg depends in addition upon whether the contactors 1A, 2A, and 3A are open or closed. For filtering purposes, a capacitor C1 may be connected across the direct current terminals of the rectifier X2.

The resistor R7, transformer T2, rectifier X2, capacitor C1 and winding 15c thus constitute a control power means arranged to be connected to a circuit of the motor 10, and, when so connected, to be operative to provide control power at a potential that depends upon an electrical condition of the motor circuit. In the present instance, the electrical condition is the secondary voltage at the terminals S1, S2, and S3 which varies inversely with the speed of the motor at speeds below synchronism, or, more specifically, is the proportionate part of this voltage which appears across the terminals S3 and S5. Thus, a supply circuit means including a voltage responsive means is provided.

From the foregoing it is seen that the supply or brake exciting circuit means 12 is supplied with power at a substantially constant potential and its included voltage responsive means is concurrently supplied with control power at a potential that varies inversely with the speed of the motor 10 and with the closed or opened condition of the main contacts of the contactors 1A, 2A, and 3A. As will become apparent hereinafter, the potential at the output terminals 12a of the brake exciting circuit means 12 is a function of the constant and variable potentials, the circuit means 12 being operative to provide amplified power at a potential that depends upon and varies inversely with the potential across the secondary terminals S3 and S5.

In the off position of the master switch MS, all of its contacts 20 through 30 are open except the contacts 21 and 22. When the master switch MS is operated in either the hoisting or lowering direction, its contacts are open except as closure thereof is indicated by the crosses in horizontal alignment with the contacts, each cross indicating that its horizontally aligned contacts are closed for the respective positions of the master switch. Thus, for example, the contacts 27 are closed in the last four hoisting positions and in the last three lowering positions, and are open in all other positions.

The contacts 22 are interposed in an energizing circuit for the operating winding of an undervoltage relay UV extending between conductors L6 and L7 which are connected to the supply lines L2 and L3, respectively, and the contacts 23 through 30 are interposed in similar energizing circuits for all of the contactors and for the relays BR and TR and extending between the conductor L6 and a conductor L8 which is connected to the conductor L7 through the contacts 22 or through normally open contacts of the undervoltage relay UV when that relay is energized and its normally-open contacts are closed.

It will be understood that the usual disconnecting switches, overload relays, fuses, and the like, may be included in the control system of Figure 1 as is well known in the art.

Figure 2:
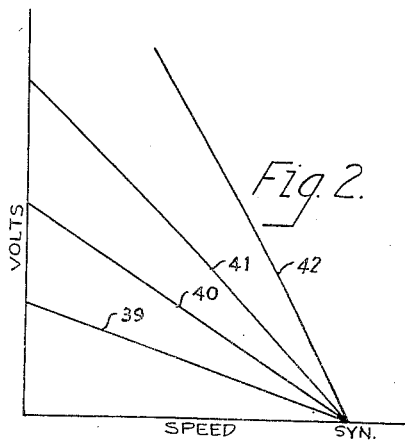

Since the potential across the secondary terminals S3 and S5 is zero at synchronous speed, the ampere turns produced by the winding 15c is zero at that time. Under these conditions, the impedance of the windings 15b is a maximum and consequently the voltage at the rectifier X1 and the current flowing through the rectifier X1 to the brake winding EW are a maximum. When the motor 10 is at standstill and its primary winding 10a is connected to the supply line L1, L2, and L3, the voltage across the secondary terminals S1, S2, and S3 is relatively large, its actual value depending upon the voltage drop in the motor 10 which in turn depends upon the amount of the resistor R effective in the secondary circuit. The voltage impressed on the winding 15c is dependent upon the voltage across the terminals S3 and S5 which is materially less than the voltage at the terminals S1, S2, and S3 when none of the secondary contactors are closed, increases relatively thereto upon closure of the contactors 1A and 2A, and increases further upon closure of the contactor 3A to become equal to $$\frac{1}{\sqrt{3}}$$

times the voltage at the terminals S1, S2, and S3. The voltage at the rectifier X1 and the current in the brake winding EW are determined by the ampere turns produced by the winding 15c which in turn depends upon the voltage at the winding 15c. Preferably, the reactor 15 is so selected that, when the motor is at rest, the voltage at the terminals 12a of the rectifier X1 and the current in the winding EW can be varied over a relatively wide range, the exact values of this voltage and current being dependent upon the amount of the resistor R effective in the secondary circuit and the adjustment of the resistor R7. Curves 39, 40, 41 and 42 of Figure 2 show how the voltage impressed on the control winding 15c varies with speed and with operation of the contactors 1A, 2A, and 3A. Curve 39 is for operation when all of the secondary contactors are open as in the first lowering speed point, curve 40 is for operation when the contactor 1A only is closed, curve 41 is for operation when the contactor 2A is closed, and the curve 42 is for operation when the contactor 3A is closed.

Consequently, as the motor 10 accelerates from standstill towards its synchronous speed, the voltage impressed on the eddy current brake winding EW increases since it varies in an inverse relation to the voltage impressed on the winding 15c. The voltage across the terminals S3 and S5 decreases as the speed of the motor 10 increases, and accordingly the voltage impressed on the winding EW varies directly with the speed. The variations of this latter voltage with speed for different effective values of the secondary resistor R are illustrated in Figure 3 wherein the voltage at the winding EW is plotted against the speed of the motor 10. As will be explained more in detail later, curves 43, 44, 45, and 46 of Figure 3 show the variations in voltage at the brake winding EW in the first four lowering positions of the master switch MS, respectively, the curves 44 and 45 also showing the variation of this voltage in the first two hoisting positions, respectively.

In the off position of the master switch MS, the closed contacts 21 complete a circuit from the transformer T1 to the rectifier X1 through the reactor 16 and the resistor R8 between its taps a and c. Even though the saturable core reactor has its maximum impedance at this time because there is no current in the winding 15c, the resistor R8 and the reactor 16 preferably so limit the current that only sufficient current flows to the brake winding EW to cause pick up the relay AD. If desired, this current limiting feature may be eliminated, and the current in the brake coil EW allowed to be at a relatively high value when the master switch is in the off position. With the relay AD picked-up, the under voltage relay UV is energized through a circuit including the contacts 22, the winding of the relay UV, the contacts of the relay AD, and normally closed contacts LS of an overhoist limit switch. The contacts LS of the limit switch are paralleled by normally closed auxiliary contacts b of the contactor H to permit closure of the relay UV when the limit switch is open and the hoist contactor H is not energized. When the relay UV is energized, its contacts are closed and connect the conductor L7 to the conductor L8, thereby to maintain the relay UV energized against opening of the contacts 22.

Considering now the operation of the control system of Figure 1, in the first hoisting position of the master switch MS, the contacts 23, 24, and 26 are closed and complete the energizing circuits for the relay BR, the contactor H, and the contactor 1A, respectively, the circuit for the contactor H including normally closed auxiliary contacts b of the contactor L. The circuit for operating winding of the relay BR is completed through the now closed contacts of the relay AD and the contacts of the limit switch LS. When these circuits are completed, the contactor H closes its main contacts m to connect the motor 10 for hoisting operations, the contactor 1A closes its main contacts m to short-circuit the resistor section R1, and the relay BR closes its contacts to complete the energizing circuit for the winding BW of the brake B which thereupon releases. Immediately after the contacts m of the contactor H close, the relays 3AR, 4AR and 5AR pick up to open their respective contacts, and the transformer T2 supplies an alternating potential to the rectifier X2.

In the first hoisting position of the master switch MS, the contacts 20 are closed so that the rectifier X2 supplies direct current to the winding 15c with only the portion of the resistor R8 between its taps a and b effective. Since the resistance of the resistor R8 between its taps a and b is small compared to the impedance of the reactor 16, almost all of the voltage drop in the circuit between the transformer T1 and the reactance windings 15b occurs across the reactor 16.

With the contacts 1A closed, the voltage between the terminals S3 and S5 is indicated by the curve 40 of Figure 2, and is related to the voltage between the terminals S3 and S7 by the ratio that the resistance of the sections R4 and R5 bears to the resistance of the sections R2, R3, R4, and R5. The voltage between the terminals S3 and S7 is equal to $$\frac{1}{\sqrt{3}}$$

times the voltage at the terminals S1, S2, and S3. Before the motor accelerates, a predetermined current flows in the control winding 15c due to the voltage across the terminals S3 and S5. This current causes the impedance of the windings 15c to be such that considerable current is shunted from the rectifier X1. The current shunted from the rectifier X1 and flowing through the windings 15b causes a material voltage drop across the reactor 16 and the portion of the resistor R8 between the taps $a$ and $b$. The voltage impressed on the winding EW at this time may be as indicated at the intercept of the curve 44 and the voltage axis in Figure 3. As the motor 10 accelerates, the voltage across the terminals S3 and S5 decreases and accordingly the excitation of the control winding 15c decreases. Consequently, less current is shunted from the rectifier X1 by the windings 15b, and the voltage at the terminals 12a increases with the speed of the motor 10 as shown by the curve 44 of Figure 3.

In the second hoisting position of the master switch MS, the contacts 27 close to complete the energizing circuits for the contactor 2A and the relay TR. The contactor 2A thereupon closes its main contacts $m$ to short circuit the additional resistor section R2 which causes the torque of the motor 10 to increase. The relay TR closes a by-pass circuit around the contacts of the relay AD for a purpose to be described. With the contactor 2A closed, the total resistance effective in the secondary circuit is the resistance of the sections R3, R4, and R5, and since the resistance of the sections R4 and R5 between the terminals S3 and S5 is now a greater portion of the total effective resistance, that is, the resistance of the sections R3, R4, and R5, the voltage across the winding 15c for any given sub-synchronous speed of the motor 10 increases and may be as indicated by the curve 41 of Figure 2. This causes the voltage across the brake winding EW to be less for any given sub-synchronous speed of the motor 10 than when the master switch MS is in the first hoisting position, and may be as indicated by the curve 45 of Figure 3. The resultant torque available to hoist a load consequently increases. Due to internal voltage drop, the voltage at the secondary terminals S1, S2, and S3 decreases when the contactor 2A operates, but this decrease is taken into account when adjusting the resistor R7.

In the third hoisting position of the master switch MS, the contacts 20 open to effect deenergization of the brake supply circuit 12. Since the eddy current brake E is now deenergized, the torque available at the motor shaft for hoisting a load increases. The relay AD is also deenergized and its contacts are open. However, the relays UV and BR remain energized because the contacts of the relay TR are closed.

In the fourth hoisting position of the master switch MS, the contacts 28 in the energizing circuit for the contactor 3A close. When the speed of the motor 10 reaches a predetermined value, the relay 3AR closes its contacts. The energizing circuit for the contactor 3A is then completed through the contacts 28, the contacts of the relay 3AR, and now closed normally open auxiliary contacts $b$ of the contactor 2A. The resultant closure of the contacts $m$ of the contactor 3A short circuits the additional resistor section R3 and the torque of the motor 10 again increases.

Movement of the master switch MS to its last hoisting position closes the contacts 29 in the energizing circuits for the contactors 4A and 5A. When the speed of the motor 10 reaches a predetermined value, the relay 4AR closes its contacts to complete the circuit for the contactor 4A through the contacts 29, the contacts of the relay 4AR, and now closed normally open auxiliary contacts $b$ of the contactor 3A. The resulting closure of the contacts $m$ of the contactor 4A short circuits the additional resistor section R4 which causes the motor 10 to accelerate until a speed is reached at which the relay 5AR closes its contacts to complete the energizing circuit for the contactor 5A through the contacts 29, the contacts of the relay 5AR, and now closed normally open auxiliary contacts $b$ of the contactor 4A. The contactor 5A thereupon responds to short circuit all of the secondary resistor R. The motor 10 now operates at its maximum hoisting speed.

Return of the master switch MS from the last hoisting position to the off position results in a switching sequence opposite to that just described. When the off position is reached, the motor 10 and the brake B are deenergized and the load is held in the elevated position by the brake B. The relay AD remains operated because of the low current circuit maintained through the contacts 21. When the master switch reached its second hoisting position, the relay TR was deenergized, but the relay TR is provided with suitable means to delay the opening of its contacts so that the relay UV is not deenergized inadvertently because of a time lag in the reclosure of the contacts of the relay AD caused by a slow build up of current in the winding EW.

In the first lowering position of the master switch MS, the contacts 23 and 25 close to complete, respectively, the energizing circuits for the relay BR and for the contactor L, the circuit for the latter being through normally closed auxiliary contacts $c$ of the contactor H. The contactor L thereupon responds to close its main contacts $m$ to connect the motor 10 for lowering operations, and the relay BR responds to close its contacts causing the brake B to release. The motor 10 is now connected for lowering operations with all of the resistor R effective in the secondary circuit.

As soon as the contacts $m$ of the contactor L close, the relays 3AR, 4AR and 5AR pick up to open their respective normally closed contacts.

Also, in the first lowering position, the contacts 20 are closed so that only the portion of the resistor R8 between the taps $a$ and $b$ is effective in the circuit from the transformer T1 to the reactance windings 15b. Since all of the resistor R is effective in the secondary circuit, the voltage impressed on the winding 15c is relatively low as indicated by the curve 39 of Figure 2 so that the winding EW is strongly energized even at slow speeds as indicated by the curve 43 of Figure 3.

In the second lowering position of the master switch MS, the contacts 26 close to complete the energizing circuit for the contactor 1A which thereupon closes its main contacts to short circuit the resistor section R1 and to cause an increase in the excitation of the winding 15c so that the voltage impressed on the winding EW for any given sub-synchronous speed of the motor 10 decreases and now varies as indicated by the curve 44 of Figure 3 as in the first hoisting position.

In the third lowering position of the master switch MS, the contacts 27 close to complete the energizing circuit for the contactor 2A and the relay TR. The contactor 2A thereupon closes its contacts $m$ to short circuit the additional resistor section R2 which causes the motor 10 to increase its torque, and the relay TR closes to by-pass the contacts of the relay AD. Closure of the contactor 2A causes a further increase in the excitation of the winding 15c resulting in a further reduction in the voltage across the winding EW to the values indicated by the curve 45 in Figure 3 as in the second hoisting position.

In the fourth lowering position of the master switch MS, the contacts 28 close to partially complete the energizing circuit for the contactor 3A through the now closed auxiliary contacts *b* of the contactor 2A which circuit is completed upon closure of the contacts of the relay 3AR when a predetermined speed is reached. Response of the contactor 3A causes the additional resistor section R3 to be short circuited and the motor torque consequently increases. The voltage between the terminals S3 and S5 is now the full secondary phase voltage and is as indicated by the curve 42 of Figure 2. Accordingly, the voltage across the winding EW decreases for any given sub-synchronous speed and now varies as indicated by the curve 46 of Figure 3.

Movement of the master switch MS to the fifth lowering position completes the energizing circuits through the contacts 30 for the contactors 4A and 5A. The circuit for the contactor 4A is completed through the now closed auxiliary contacts *b* of the contactor 3A and the contacts *m* of the contactor 4A thereupon close to short circuit the additional resistor section R4 causing a further increase in the torque of the motor 10. The contactor 5A is energized through the now closed auxiliary contacts *b* of the contactor 4A and responds to short circuit all of the secondary resistor R. When the master switch MS reaches the fifth lowering position, the contacts 20 open to disconnect the winding EW from its source of energization, and the brake E no longer exerts a retarding torque. Overhauling loads are now lowered by regenerative braking alone.

Upon return of the master switch MS from any one of its lowering positions to its off position, the contactors L and 1A through 5A and the relays TR and BR are deenergized. Since the contacts of the time delay relay TR remain closed for a time interval after deenergization of its operating winding, the relay UV remains excited through those contacts for a predetermined time interval or until the relay AD picks up.

It is apparent that one or more steps of unbalanced voltage braking could be provided for the motor 10 with or without assistance from the braking generator.

Referring now to Figure 4 wherein parts like those in Figure 1 are referred to by the same reference characters, a manual controller MC is illustrated in elementary form. The controller MC may be either a drum controller or face-plate controller having contacts 51 through 67 all of which except the contacts 67 are open in the off-position and all other positions except as closure thereof in the other positions is indicated by the crosses in horizontal alignment with the contacts. The contacts 67 are closed in the off-position and also in the operating positions indicated by its aligned crosses.

When main contacts *m* of an electromagnetic contactor M are closed, closure of the contacts 51 and 52 connects the motor 10 for hoisting operations and closure of the contacts 53 and 54 connects the motor for lowering operations.

The contacts 55 through 64 control the effective value of the secondary resistor R, the same sequence being provided as in Figure 1 except that a fifth speed point is provided which corresponds to the condition after closure of the contactor 4A and before closure of the contactor 5A. The sixth speed point in Figure 2 is the same as the fifth speed point in Figure 1.

The contacts 65 control the time delay relay TR which has its normally open contacts interposed in an operating circuit for the contactor M. The contacts of the relay TR are in parallel with the contacts of the relay AD. The circuit to the operating winding of the contactor M is completed by the contacts 66 in all operating positions provided that the contacts of the relay TR or AD are closed, the relays AD and TR performing the same protective functions as in Figure 1.

The brake exciting circuit means 12 in Figure 2 is controlled in the same manner as in Figure 1 and further description is therefore unnecessary. It should be noted that only the contacts 65, 66, and 67 are required on the controller MC for effecting the additional control required by the addition of the eddy current brake E to the system.

Having thus described our invention, we claim:

1. A control system comprising a polyphase wound rotor induction motor having a primary winding and a secondary winding which is connected to an adjustable resistor, adjusting means operable to adjust the effective value of said resistor thereby to change the torque output of said motor and to alter the voltage across an energized portion of said resistor, a control means for controlling the operation of said motor in accordance with the magnitude of energizing voltages impressed on the control means, a supply circuit means connected to said control means and operative to impress said energizing voltages on said control means, a voltage responsive means in said supply circuit means and operative to vary said energizing voltages in relation to variations in a voltage impressed on said voltage responsive means, and said voltage responsive means being connected across said energized portion of said adjustable resistor for impressing on said voltage responsive means the voltage across said energized portion, whereby the voltage impressed on said voltage responsive means changes in response to operation of said adjusting means and the speed of the motor.

2. A control system according to claim 1 characterized in that said relation is an inverse relation.

3. A control system comprising a polyphase wound rotor induction motor having a primary winding and a secondary winding which is connected to an adjustable resistor having series connected portions, adjusting means operable to adjust said resistor by excluding one of said portions from operative connection with said secondary winding, a control means for controlling the operation of said motor in accordance with the magnitude of energizing voltages impressed on the control means, a supply circuit means connected to said control means and operative to impress said energizing voltages on said control means, a voltage responsive means in said supply circuit means and operative to vary said energizing voltages in accordance with variations in a voltage impressed on said voltage responsive means, and said voltage responsive means being connected across a non-excluded one of said portions for impressing on said voltage responsive means the voltage across said non-excluded one of said portions, whereby the voltage impressed on said voltage responsive means changes in response to operation of said adjusting means and the speed of the motor.

4. The control system of claim 1 characterized in that said control means is a power consuming device operatively coupled to said motor and having a field winding connected to said supply circuit means so as to have said energizing voltages impressed thereon.

5. The control system of claim 4 characterized in that said power consuming device is an eddy current brake and has its rotor mechanically coupled to the motor.

6. The control system of claim 1 characterized in that said voltage responsive means includes an amplifier having an impedance winding for controlling, in relation to its impedance, the magnitude of the energizing voltages, and having a control winding for controlling the impedance of the impedance winding.

7. The control system of claim 3 characterized in that said adjustable resistor is a Y-connected resistance bank having a plurality of legs each connected at one end to said secondary winding and at the other end to a common neutral point, and said resistor portions are in the same leg and the non-excluded one of said portions is between said excluded one of said portions and said secondary winding.

8. A control system in accordance with claim 1 characterized in that said adjusting means is operable to alter said voltage across said energized portion of said resistor in a plurality of discrete steps.

9. In a control system including a braking generator having a field winding, a polyphase wound rotor induction motor mechanically coupled to said braking generator and having a primary winding and a secondary winding which is connected to an adjustable resistor, a supply circuit for said field winding including a voltage responsive means and operative to vary the current in said field winding in inverse relation to the voltage impressed on said voltage responsive means, means connecting said voltage responsive means across only a portion of said resistor so that the voltage drop across said resistor portion is impressed on said voltage responsive means, and adjusting means for said resistor operable to change the ratio between the voltage drop across said resistor and the voltage drop across said resistor portion.

10. The control system of claim 9 characterized in that said resistor is star-connected having a neutral point, said portion of said resistor is remote from said neutral point, and said adjusting means is operable to change the resistance effective between said portion and said neutral point.

11. A control system comprising a polyphase wound rotor induction motor having a primary winding and a secondary winding which is connected to an adjustable resistor, adjusting means operable to adjust the effective value of said resistor thereby to change the torque output of said motor and the magnitude of the current flowing in an energized portion of said resistor, a control means for controlling the operation of said motor in accordance with the magnitude of energizing voltages impressed on the control means, a supply circuit means connected to said control means and operative to impress said energizing voltages on said control means, a voltage responsive means in said supply circuit means and operative to vary said energizing voltages in inverse relation to variations in a voltage impressed on said voltage responsive means, and said voltage responsive means being connected to said energized portion of said adjustable resistor for impressing on said voltage responsive means a voltage related to the magnitude of the current flowing in said energized portion, whereby the voltage impressed on said voltage responsive means changes in response to operation of said adjusting means and the speed of the motor.

12. A control system according to claim 1 characterized in that said supply circuit means is operative to impress said energizing voltages on said control means irrespective of the direction of operation of the motor, a reversing means is provided for said motor, and a master switch is operable to control said reversing means and said adjusting means.

References Cited in the file of this patent

UNITED STATES PATENTS

| | | |
|---|---|---|
| 2,238,613 | Wickerham | Apr. 15, 1941 |
| 2,325,413 | McArthur et al. | July 27, 1943 |
| 2,325,454 | Wilcox | July 27, 1943 |
| 2,498,238 | Rath | Nov. 15, 1949 |
| 2,581,315 | Widdows et al. | Jan. 1, 1952 |